(12) United States Patent  (10) Patent No.: US 7,791,240 B2
Alfermann et al.  (45) Date of Patent: Sep. 7, 2010

(54) STIR-WELDED ROTORS AND METHODS OF MAKING

(75) Inventors: Timothy J. Alfermann, Noblesville, IN (US); Arthur L. Mc Grew, Jr., Indianapolis, IN (US); Ahmed M. El-Antably, Indianapolis, IN (US); Charles B. Lucas, Indianapolis, IN (US); Mark L Anderson, Carmel, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 444 days.

(21) Appl. No.: 11/829,270

(22) Filed: Jul. 27, 2007

(65) Prior Publication Data

US 2009/0026877 A1   Jan. 29, 2009

(51) Int. Cl.
*H02K 17/16* (2006.01)
(52) U.S. Cl. .............. 310/166; 310/211; 310/216.114; 310/216.136; 310/261.1; 228/112.1; 228/2.1; 428/580; 29/598
(58) Field of Classification Search .............. 310/166, 310/211, 216.114, 216.136, 261.1; 228/112.1, 228/2.1; 428/580; 29/598
See application file for complete search history.

(56) References Cited

U.S. PATENT DOCUMENTS

| 1,841,122 A * | 1/1932 | Hoseason ............. 310/211 |
| 6,998,752 B2 * | 2/2006 | Yasuhara et al. ............. 310/211 |
| 2009/0026877 A1 * | 1/2009 | Alfermann et al. ........... 310/261 |

* cited by examiner

*Primary Examiner*—Quyen Leung
*Assistant Examiner*—David W. Scheuermann
(74) *Attorney, Agent, or Firm*—Ingrassia Fisher & Lorenz, P.C.

(57) ABSTRACT

Provided are stir-welded rotors and methods of making these. An exemplary stir-welded rotor may include a stack of laminations that each has spaced-apart slots arrayed on an outer circumference. The slots register with slot bars that each has a first extremity extending above the stack of laminations and a second extremity extending below the stack of laminations. A first weld extends between first extremities of adjacent slot bars, and a second stir weld extending between adjacent second extremities of adjacent slot bars.

8 Claims, 12 Drawing Sheets

STIR-WELDED ROTORS AND METHODS OF MAKING

TECHNICAL FIELD

The embodiments described herein generally relate to electrical motors, and more particularly relate to stir-welded rotors for electric motors.

BACKGROUND

In principle, a typical induction motor includes at a minimum a central rotor surrounded by a stator. The stator includes windings through which an electrical current flows to produce a magnetic field. The magnetic field interacts with the rotor thereby causing the rotor to rotate.

Induction motors are relatively efficient in converting electrical energy into mechanical energy and as a result there is an increasing interest in such motors in a variety of applications, including in the automotive field. Induction motors may, for example, find increasing application in hybrid powered vehicles that use a combination of an internal combustion engine and one or more electric motors to provide motive power. Electrical induction motors find application in other areas as well as providing supplemental motive power. For example, induction motors may provide power to a range of accessories that might otherwise be powered via hydraulic or other systems that are driven by an internal combustion engine. With increasing applications in the automotive field, there is also a need for induction motors that conform to desired design parameters such as vehicle total mass, vehicle mass distribution, vehicle packaging that imposes space limitations, and cost and ease of mass production.

Induction motor rotors can be costly to build because they are currently often made by die casting and then machining the die cast rotor. FIGS. 1-2 illustrate an example of three stages of making a typical rotor 10. The final rotor 10 shown in FIG. 1 includes a stacked series of consolidated steel laminations 40, seen more clearly in FIG. 2 in pre-consolidated form. FIG. 2 illustrates circular steel laminations 20 arrayed in a vertical stack 30. These laminations each have a central circular hole 24 and each lamination has a perimeter that includes a series of slots 22. Typically, these laminations 20 are stacked and are then consolidated by die casting, while also forming a lower end ring 32 and an upper end ring 38, as shown in FIG. 1. In the die casting process, molten aluminum flows between the slots 22 of the stacked laminations to consolidate the laminations 20 and also to form the upper end ring 38 and lower end ring 32, shown in FIG. 1, after appropriate post-casting machining.

The above-described process imposes limitations on manufacturing rotors. For example, metals and materials are restricted to those suitable for use in die casting processes. There may have to be a trade-off between materials desired and the castability of the materials. For example, aluminum alloy 6101-T6 might be a desirable fabrication material for rotors due to its strength and electrical properties. However, this alloy's affinity for iron causes accelerated die wear and thereby increases rotor cost. Thus, die casting process-related properties of a material may discourage its use even if it is potentially better and/or less expensive. Die casting process-related properties may also preclude the use of materials that might be expected to improve the performance of the induction motor because the materials cannot be die cast. Further, die casting may require additional step of post-casting machining of the rotor, which imposes additional costs.

Accordingly, it is desirable to develop processes for manufacturing induction motor rotors that do not have the limitations of the die casting method with respect to materials selection. In addition, it is desirable that the processes minimize post-production rotor machining requirements, if any, to reduce costs. Further it is desirable that the processes produce rotors that have superior characteristics in at least some respects, for example in terms of lighter weight, lower cost, decreased porosity, more electrical effectiveness and/or allow improved designs, for example, through better packaging based on more compact rotors and induction motors. Furthermore, other desirable features and characteristics of the processes and rotors will become apparent from the subsequent detailed description and the appended claims, taken in conjunction with the accompanying drawings and the foregoing technical field and background.

BRIEF SUMMARY

An exemplary embodiment of a stir-welded rotor may include a stack of laminations that each has spaced-apart slots arrayed on an outer circumference. The slots register with slot bars that each has a first extremity extending above the stack of laminations and a second extremity extending below the stack of laminations. A first weld extends between first extremities of adjacent slot bars, and a second stir weld extends between second extremities of adjacent slot bars.

Another example of an embodiment of a stir-welded rotor may have a first and a second end ring. A stack of laminations is interposed between the first end ring and the second end ring. Each of the laminations has spaced-apart slots arrayed on an outer circumference and slot bars register with the spaced-apart slots. The slot bars have first extremities and second extremities. A first stir weld extends between first extremities of the slot bars and a second stir weld extends between second extremities of the slot bars.

An exemplary embodiment of a method of making stir-welded rotors may include, in any sequence, the following steps. Stacking laminations that each has spaced-apart slots on their respective outer circumference. Registering each of the spaced-apart slots with a corresponding slot bar of an array of slot bars, where each slot bar has a first extremity and a second extremity. In addition, restraining reciprocal and rotational movement of the stacked laminations, and stir welding first extremities of the slot bars to form a substantially continuous circular stir weld.

BRIEF DESCRIPTION OF THE DRAWINGS

Various embodiments will hereinafter be described in conjunction with the following drawing figures, wherein like numerals denote like elements.

DETAILED DESCRIPTION

Figure 1:
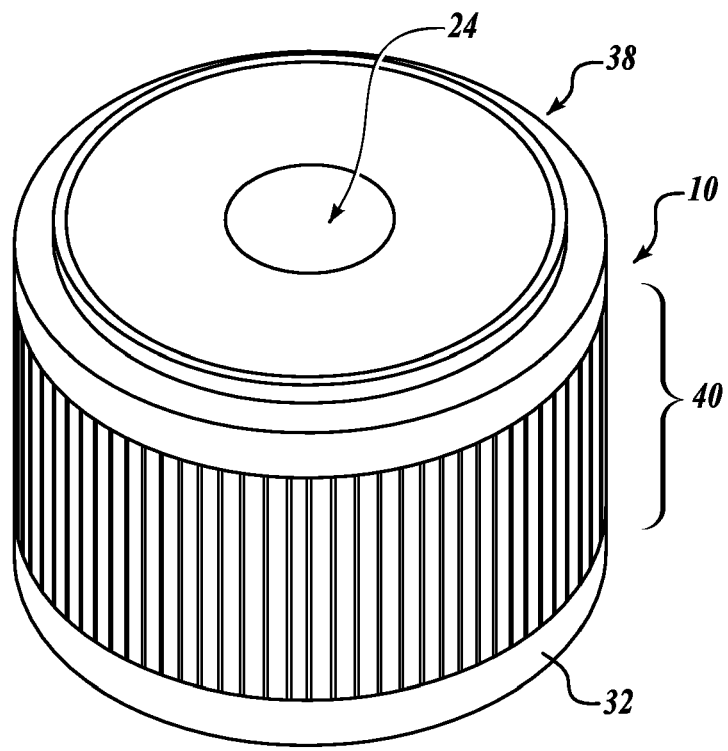
FIG. 1 is an illustration of a prior art induction motor rotor.
Figure 2:
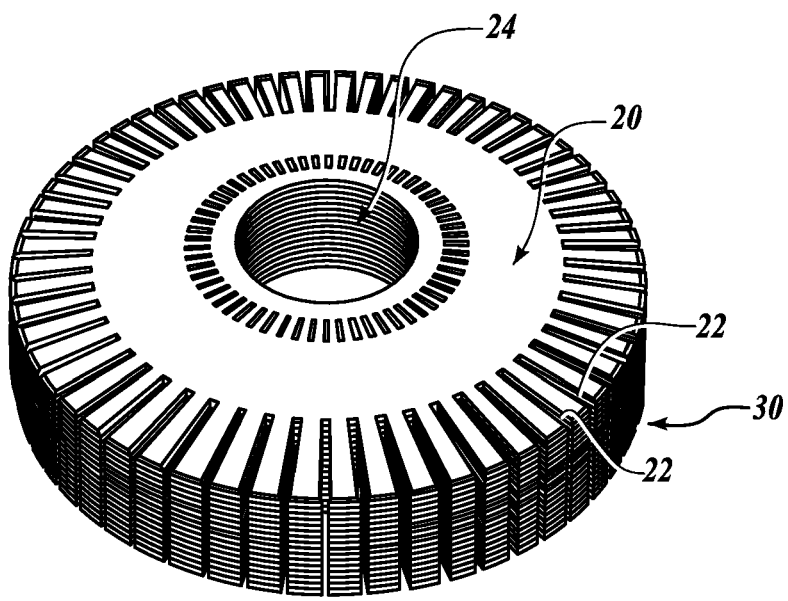
FIG. 2 is an illustration of a stack of laminations of the prior art used to make an induction motor rotor.

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description. Conventionally, the term "inboard" as used herein refers to a position relative to a point of reference (or component of the rotor) and indicates a position closer to an axial center line of the rotor than the point of reference. The term "outboard" conversely refers to a position further from an axial centerline of the rotor than the point of reference (or component of the rotor).

Exemplary embodiments provide the potential of using manufacturing processes that are less costly alternatives to die casting, that enable the use of a wider variety of alloys, and that provide rotors with tight tolerances. Construction methods may reduce the need or extent of subsequent machining of a rotor relative to a die cast rotor. Further, exemplary embodiments may have little or no porosity issues that cause degradation of strength and electrical properties.

In general, laminations may be made of steel while slot bars may be of any material with good electrical conductivity and adequate strength, such as aluminum 6101-T6 or copper. The end rings may be of the same material as the slot bars or may of a different material, for example aluminum 6061-T6.

An exemplary embodiment, illustrated in FIGS. 3-6, shows how the rotor components may be assembled for a stir-weld consolidation process. In this particular example, the stir weld assembly 100 includes a series of nested components. The stir weld assembly 100 includes an outer assembly ring 110 and an inner assembly ring 120. The inner assembly ring 120 and the outer assembly ring 110 provide support for the rotor components during the stir weld process. The stir weld assembly 100 includes a stack of flat plate-like laminations 130 (FIG. 6) with central holes 135 abutting the inner assembly ring 120 and outside diameters supported against the outer assembly ring 110.

Figure 3:
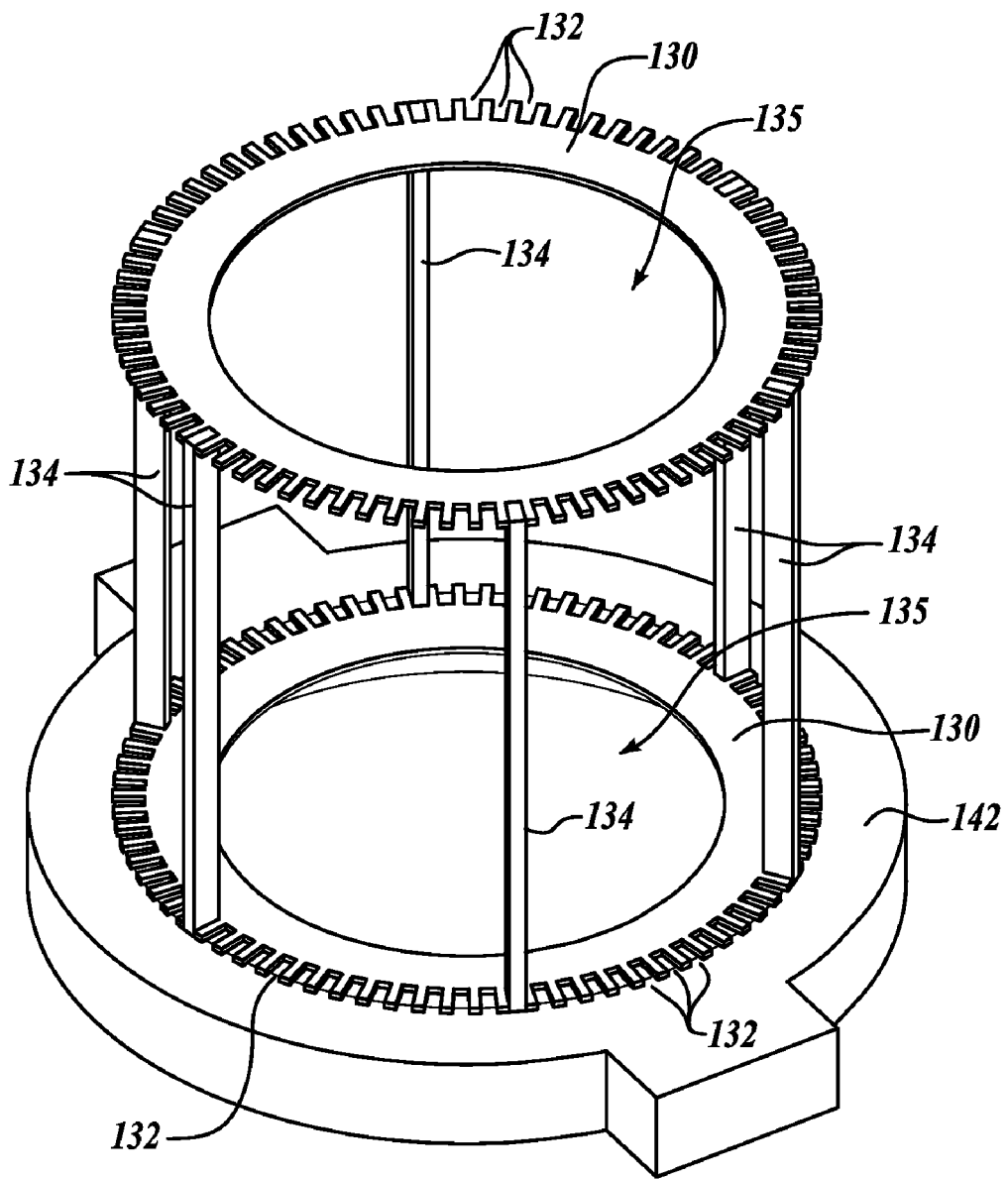
FIG. 3 is a perspective view of an exemplary embodiment of a rotor assembly being assembled and illustrates stacking of laminations onto an end ring with vertical slot bars in place.
Figure 4:
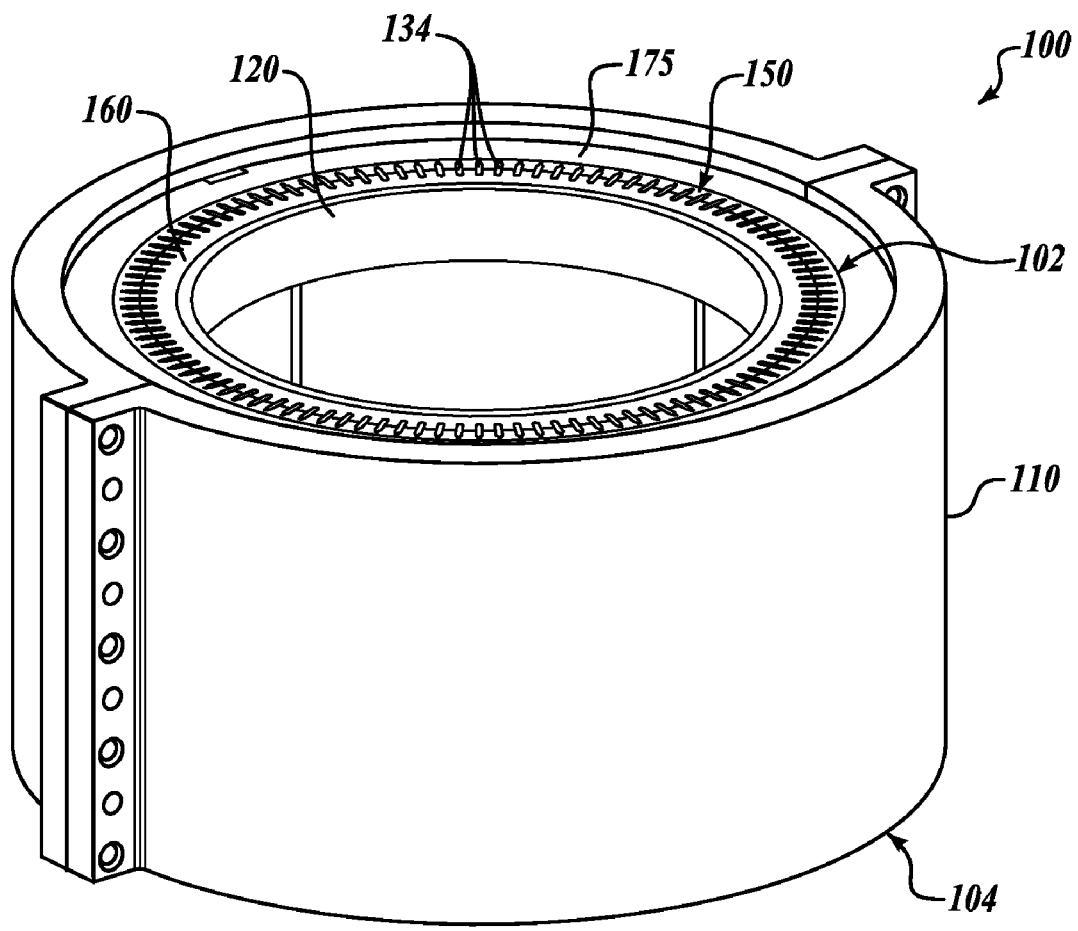
FIG. 4 is a perspective view of an exemplary embodiment of a rotor assembly including an outer assembly ring and an inner assembly ring.
Figure 6:
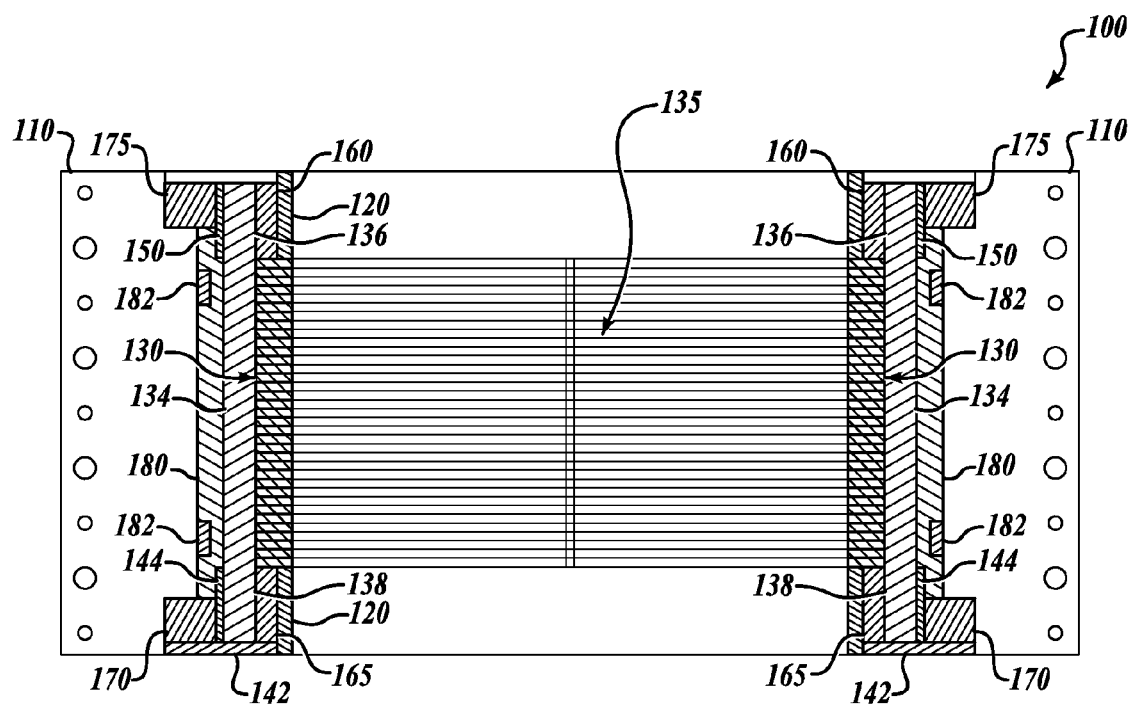
FIG. 6 is a cross-sectional view along 6-6 of FIG. 5.

More particularly, in this example, the laminations 130 have regularly-spaced slots 132 on their outer circumferences each of which registers with a vertical slot bar 134, as shown in FIG. 3. Each slot bar 134 is supported in a vertical orientation on a lower separator plate 142. The slot bars may be at least partially wrapped in a thin electrically insulating material, such as NOMEX® (Trademark of DuPont of Wilmington, Del.) to provide a barrier between the slot bar 134 and laminations 130 to improve the electrical performance of the rotor. An inner assembly ring 120 abuts against the central holes 135 of the laminations 130 as stacked, as shown in FIG. 6, for example. A lower outer end ring 144, with vertical grooves (not shown) that register with the lower ends 138 of the slot bars 134 extends around the outside of the array of slot bars 134. As seen in FIG. 6, a lower inner end ring 165, with vertical grooves (not shown) that register with the lower ends 138 of the slot bars 134 is interposed between lower ends 138 of slot bars 134 and the inner assembly ring 120. Thus, lower outer end ring 144 and lower inner end ring 165 together surround the a portion of the vertical lower ends 138 of slot bars 134.

Once the laminations 130 are assembled into a stack, an upper inner end ring 160 with vertical grooves that register with upper ends 136 of the slot bars 134 (See FIG. 5) is interposed between upper ends 136 of slot bars 134 and the inner assembly ring 120. Further, an upper outer end ring 150 with vertical grooves that register with upper ends 136 of the slot bars 134 (See FIG. 5) extends around the outside of the array of slot bars 134. Thus, upper outer end ring 150 and upper inner end ring 160 together surround a portion of the vertical upper ends 136 of slot bars 134. Accordingly, the slot bars 134 are restrained from rotational and reciprocal motion. As a result, the laminations 130 are restrained from rotational motion relative to each other by the slot bars 134 that are, in turn, restrained by the end rings 144, 165, 150, 160.

A lower weld ring 170 extends around the lower outer end ring 144 and rests upon the lower separator plate 142. Lower weld ring 170 lies beneath an outer end ring 180 that extends upward to an underside of upper weld ring 175. Upper weld ring 175 is held in place between the outer end ring 180 and the surrounding outer assembly ring 110.

In some examples of stir weld assembly embodiments, the outer end ring 180 may be supplied with channels 182 for a supply of a suitable coolant to minimize potential heat effects during stir welding.

Figure 5:
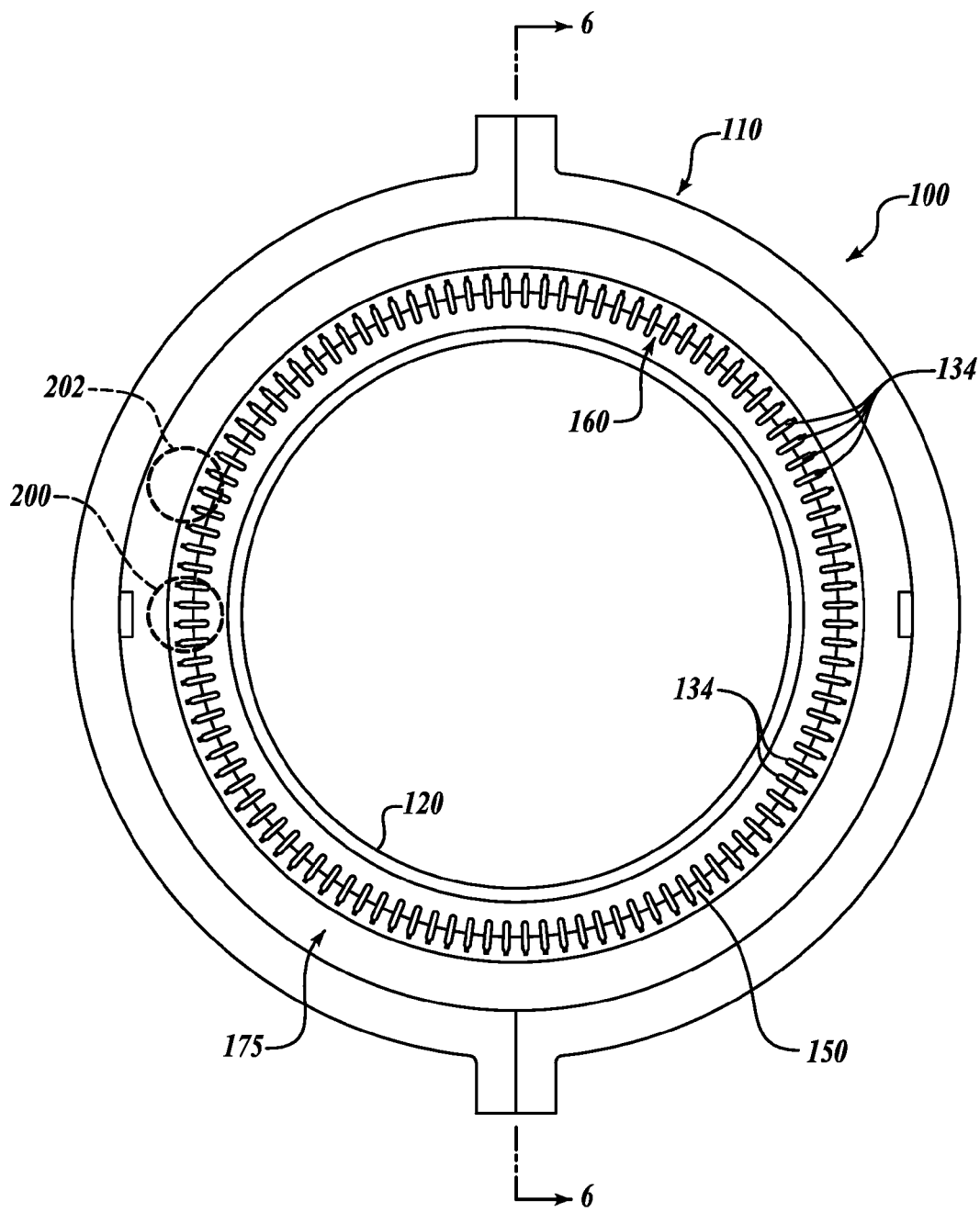
FIG. 5 is a top view of the embodiment of FIG. 4.
Figure 7:
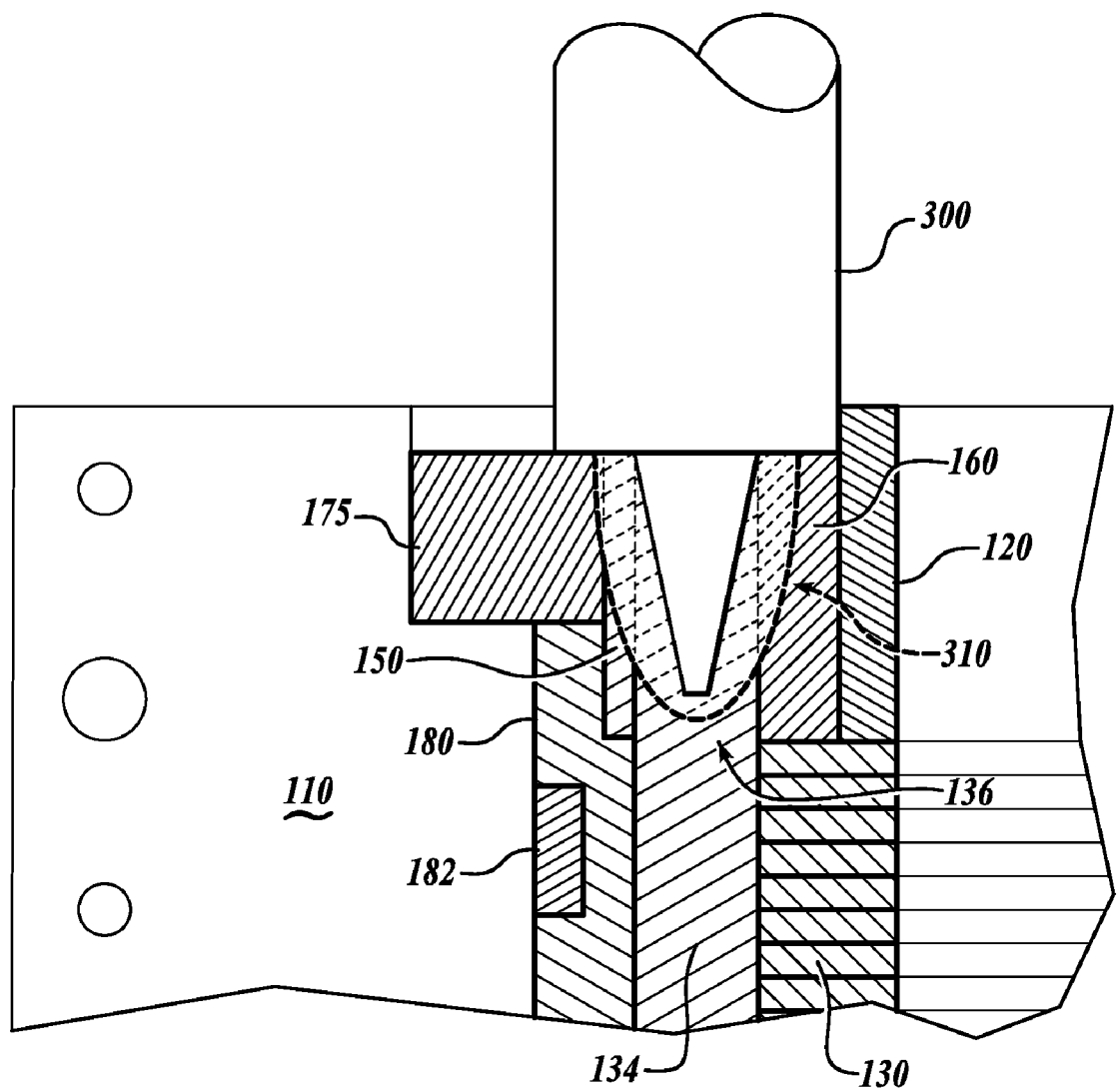
FIG. 7 is a portion of a cross-sectional view illustrating an example of a stir weld zone.

During stir welding, the halves of the outer assembly ring 110 are clamped or bolted together so that the above-described components of the stir weld assembly 100 are restrained from movement relative to each other. A stir weld tool then welds both the upper end 102 and the lower end 104 of the stir weld assembly 100. An example of the area covered by the stir weld tool is shown in FIG. 5, as circles 200, 202. Of course, single pass welding or other techniques may also be used. Further, FIG. 7 illustrates schematically a stir weld tool 300 and the welding zone 310 beneath the tool. The welding zone 310 encompasses the upper weld ring 175, the upper ends 136 of the slot bars 134 and the upper inner end ring 160. These components are stir-welded for the entire upper ends 102 and lower ends 104 of the stir weld assembly 100 to produce a substantially continuous stir weld. The stir-welded rotor assembly may then be subjected to machining to remove extraneous material.

Figure 8:
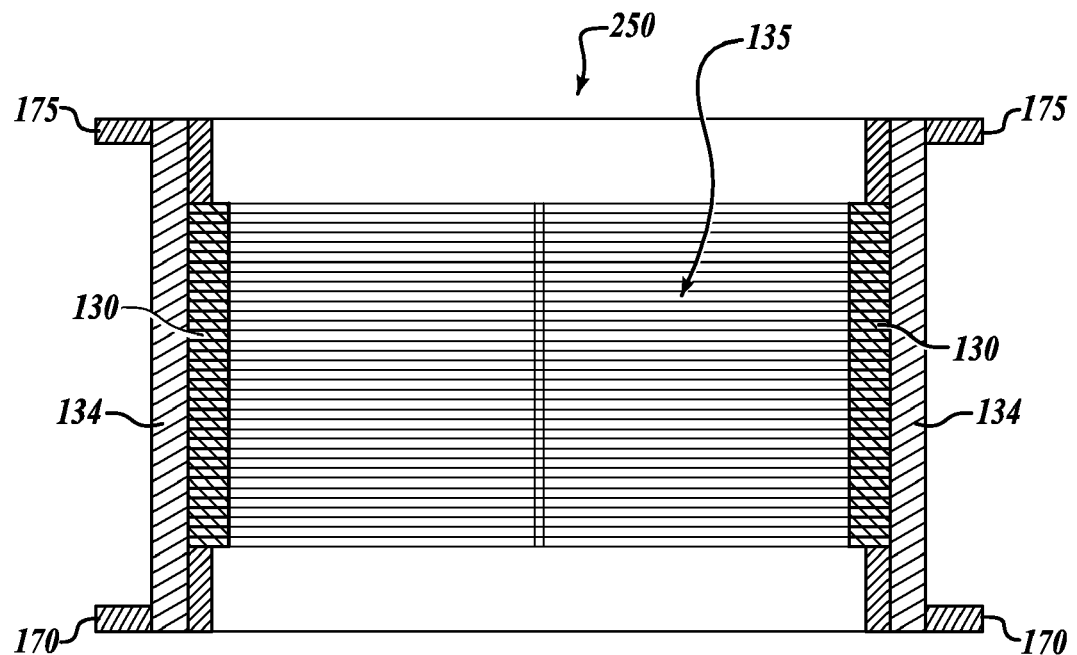
FIG. 8 is a cross-sectional view of an example of a stir-welded rotor that is ready for stamping.

FIG. 8 illustrates an example of a stir-welded rotor 250. To produce stir-welded rotor 250, the inner assembly ring 120 and outer assembly ring 110 were removed. The stir-welded rotor will then be stamped to remove lower weld ring 170 and upper weld ring 175 from upper end 102 and lower end 104 of the stir weld assembly 100, without affecting the slot bars 134.

Figure 9:
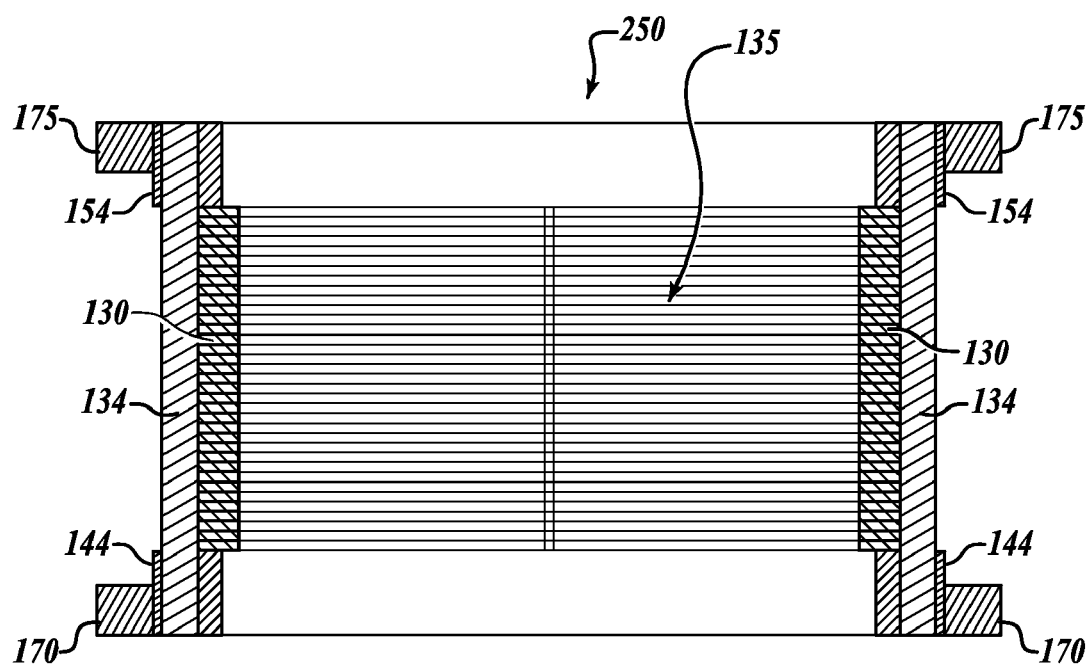
FIG. 9 is a cross-sectional view of an example of a stir-welded rotor that is ready to be machined axially and radially.

FIG. 9 illustrates another example of a stir-welded rotor 250. To produce stir-welded rotor 250, the inner assembly ring 120 and outer assembly ring 110 were removed. The stir-welded rotor 250 was then axially machined without affecting the slot bars 134 while retaining upper outer end ring 150 and a lower outer end ring 144 at least partially intact. The remaining portions of the upper weld ring 175 and lower weld ring 170 may be removed by a radial machining process, if necessary or desired.

Figure 10:
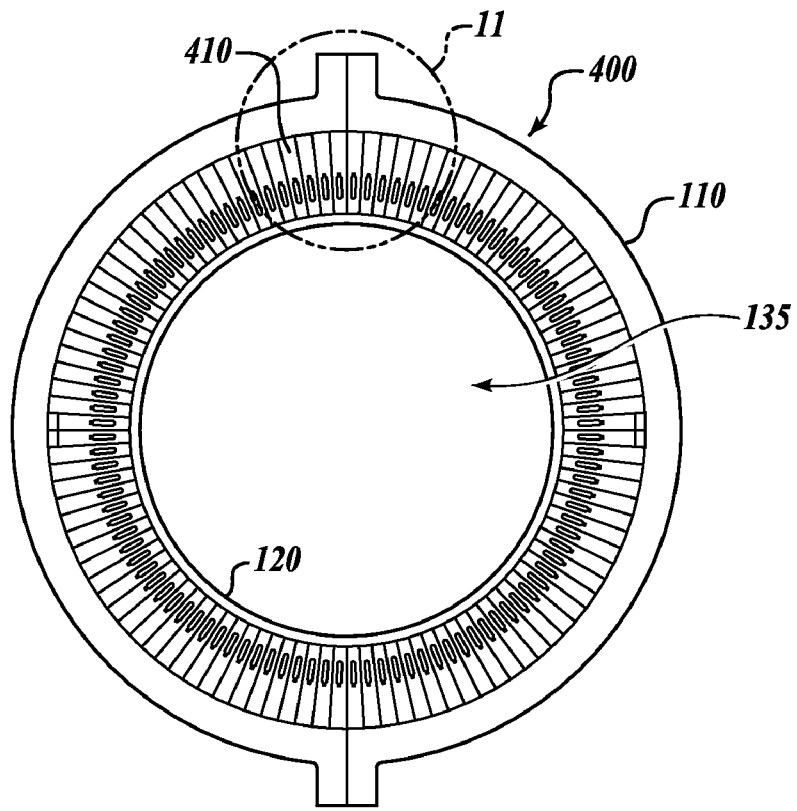
FIG. 10 is a top view of another exemplary embodiment of a rotor assembly including an outer assembly ring and an inner assembly ring.
Figure 11:
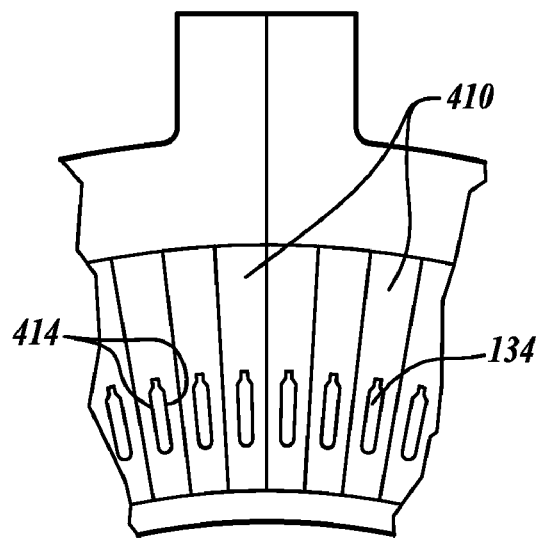
FIG. 11 is an enlarged view of a portion of the embodiment of FIG. 10 to show detail.

FIGS. 10-11 illustrate a top view and an enlarged view of a portion of the top, respectively, of another embodiment of a stir weld assembly 400 for making stir-welded rotors. In this stir weld assembly 400, a plurality of flat wedge-shaped stir-weldable metal keys 410 are used to form upper and lower end rings. The keys 410 each have cutouts 414 that are sized to receive apportion of a cross section of a slot bar, of which only upper bar ends 136 are shown. Thus, when the cutouts are arrayed on the stir weld assembly 400, they cover the surface, except for the upper ends 136 of the slot bars (and the inner assembly ring 120 and outer assembly ring 110, which are both removed after stir welding is complete).

Figure 12:
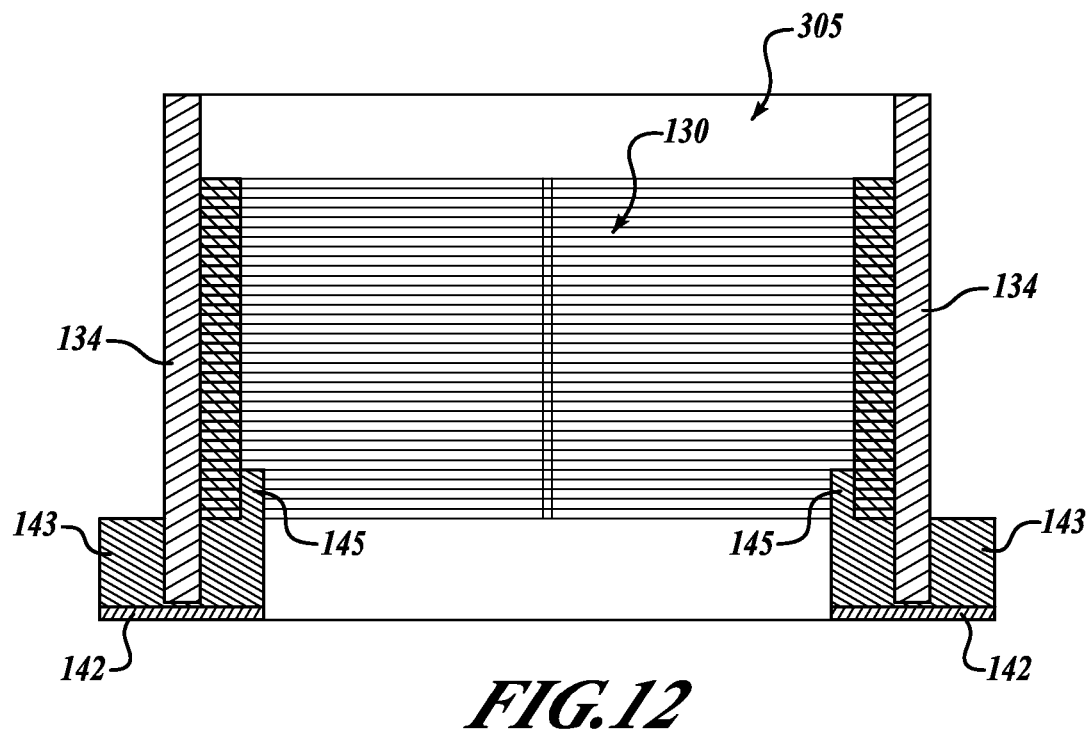
FIGS. 12-15 depict an exemplary embodiment in various stages of production, in cross section.
Figure 13:
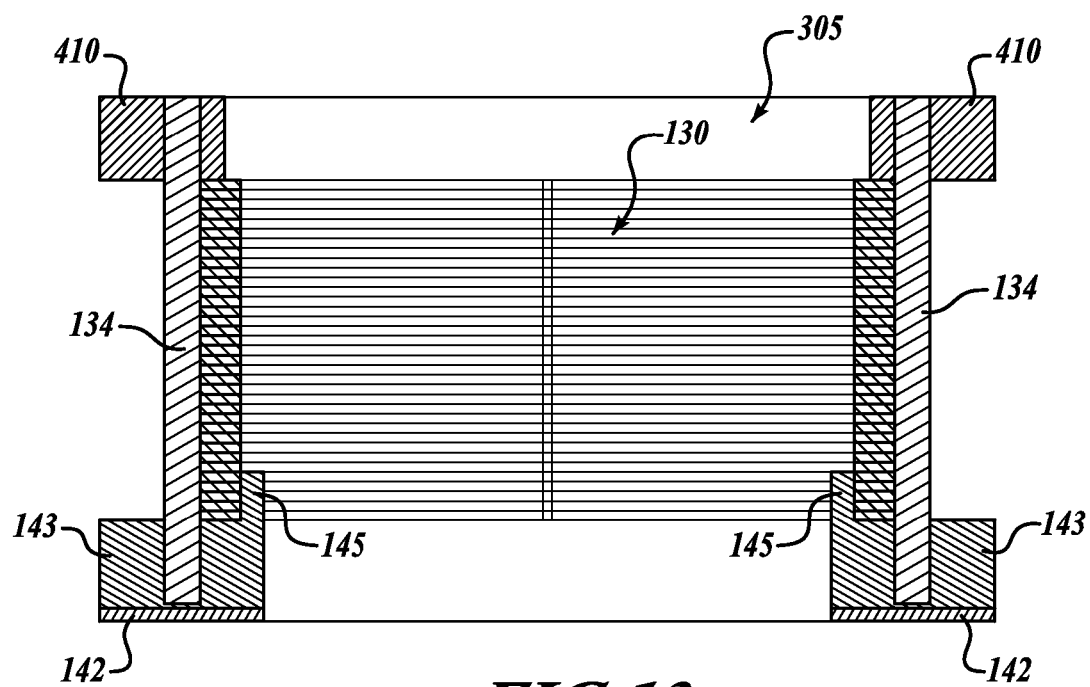
Figure 14:
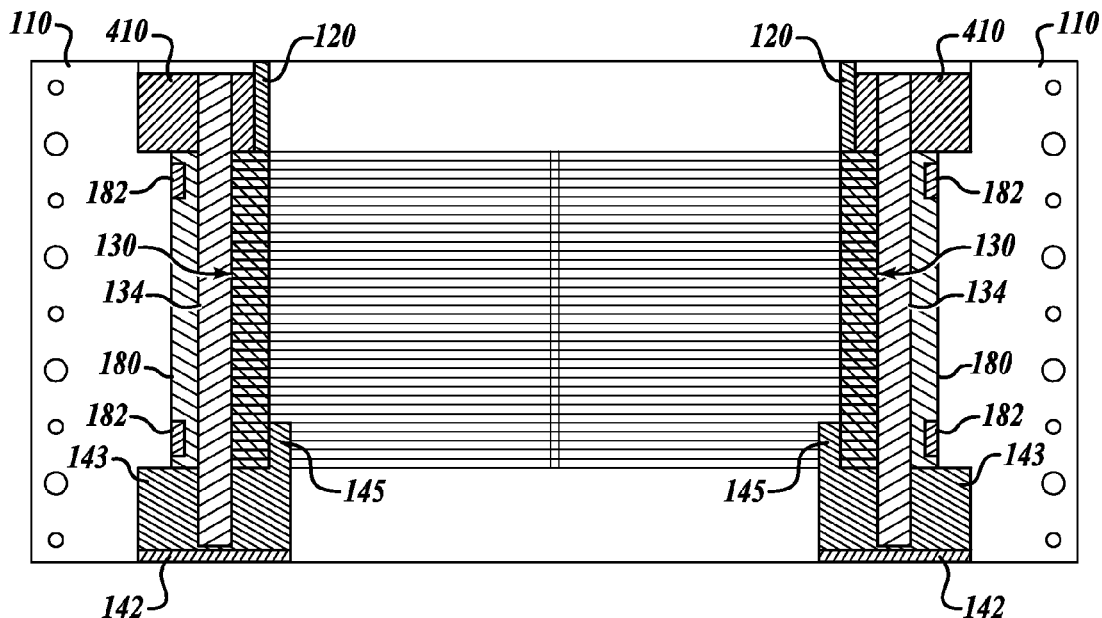
Figure 15:
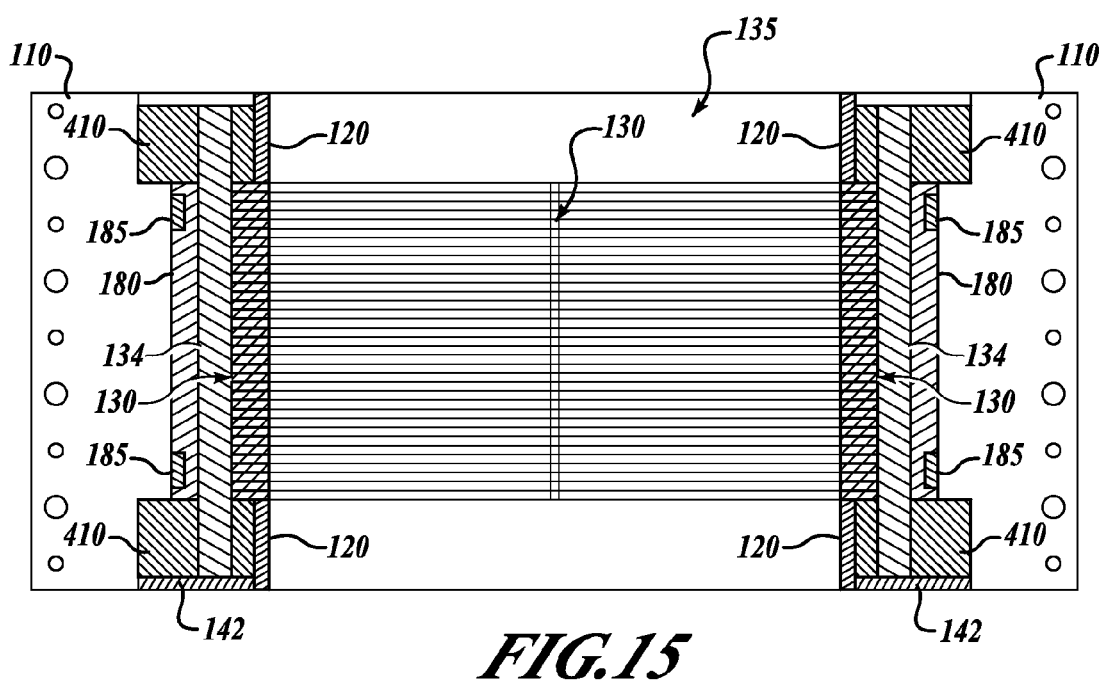

FIGS. 12-15 illustrate stages in the fabrication of an embodiment that includes keys 410. In FIG. 12, a flat circular lower separator plate 142 supports a toothed separator plate 143 that has a series of teeth 145 around its perimeter that are sized to register with slots in the laminations 130 and the bars 134. The lower separator plate 142 is configured to engage the central holes 135 of the laminations and the slot bars 134. When the laminations 130 are stacked to a desired height, the slot bars 134 are inserted as shown in FIG. 12. In FIG. 13, keys 410 are arrayed along the upper end of the assembly around the upper ends of slot bars 134, as shown in FIGS. 10-11. In FIG. 14, the inner assembly ring 120 is applied and the outer assembly ring 110 is clamped around the assembly. The assembly is now in condition for stir welding of the keys 410 to the slot bars 134. After stir welding, the assembly is upended, as shown in FIG. 15. The lower separator plate 142 is removed and placed beneath the assembly, adjacent the welded keys 410, to act as a support during welding of the other end of the assembly. In addition, keys 410 are arrayed at the upper end of the assembly, around slot bars 134, to form a complete coverage of the surface area between the slot bars 134 and an applied inner assembly ring 120. The keys 410 are then stir welded to the upper ends of slot bars 134 slot bars to form a substantially continuous circular stir weld.

Figure 16:
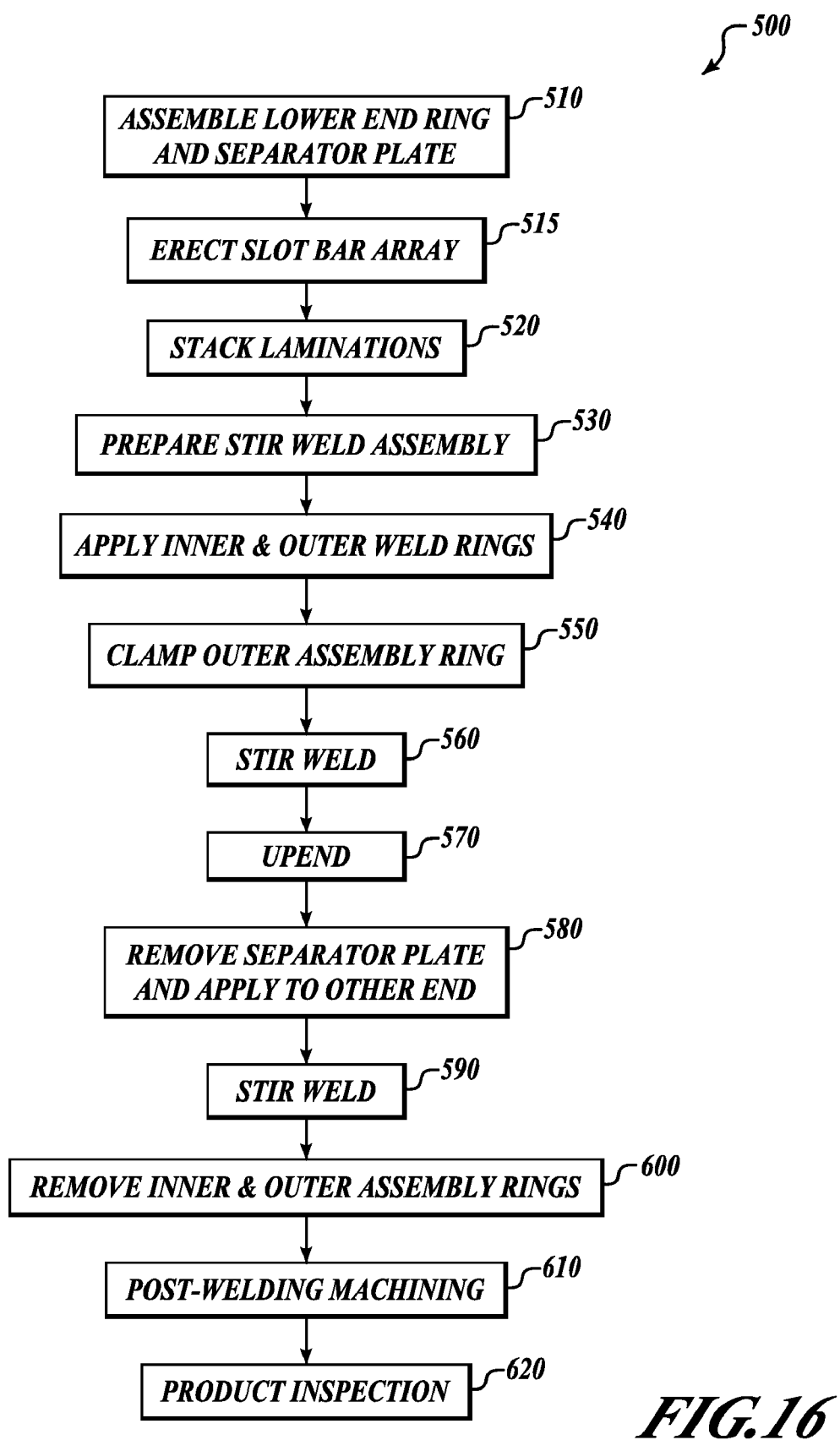
FIG. 16 is an example of an embodiment of a method of making stir-welded rotors.

FIG. 16 is an exemplary embodiment of a process 500 for making stir-welded rotors. Of course, other embodiments may use fewer or more steps, or different steps, or may carry out steps in a different sequence. In the exemplary embodiment of FIG. 16, rotor assembly commences with selecting and laying down a separator plate and lower end ring in process 510. An array of spaced-apart vertical slot bars is erected on the lower end ring, in process 515. Laminations are stacked on top of the inner assembly ring and the lower end ring such that each slot of each lamination registers with a corresponding slot bar, in process 520. Once lamination stacking is complete, the weld assembly is prepared in process 530 by adding an upper end ring on top of the stack. In addition, an inner assembly ring, typically a slightly tapered steel cylinder, is fitted into the inner circumference of the end ring.

In process 540, the weld ring is applied to hold the assembled components in place during the welding process or to provide more space for the stir weld tool. The outer assembly ring is clamped around the assembly in process 550. In process 560, the assembly is stir welded to weld the slot bars to the end ring to form a substantially continuous circular stir weld In process 570, the assembly is upended, and the separator plate is removed and applied to the welded end to provide support on the work surface, in process 580. In process 590, the top end is now stir welded to weld the end ring to the slot bars to form a substantially continuous circular stir weld.

After stir welding, the inner and outer assembly rings may be removed in process 600. The manufactured rotor is now in condition for post-weld machining in process 610, Post-stir welding machining may include, for example, axial machining, radial machining and stamping to remove any extraneous material to produce a finished stir-welded rotor. Finally, the machined and stir-welded rotor product may be subjected to inspection for quality and performance criteria, in process 620.

Figure 17:
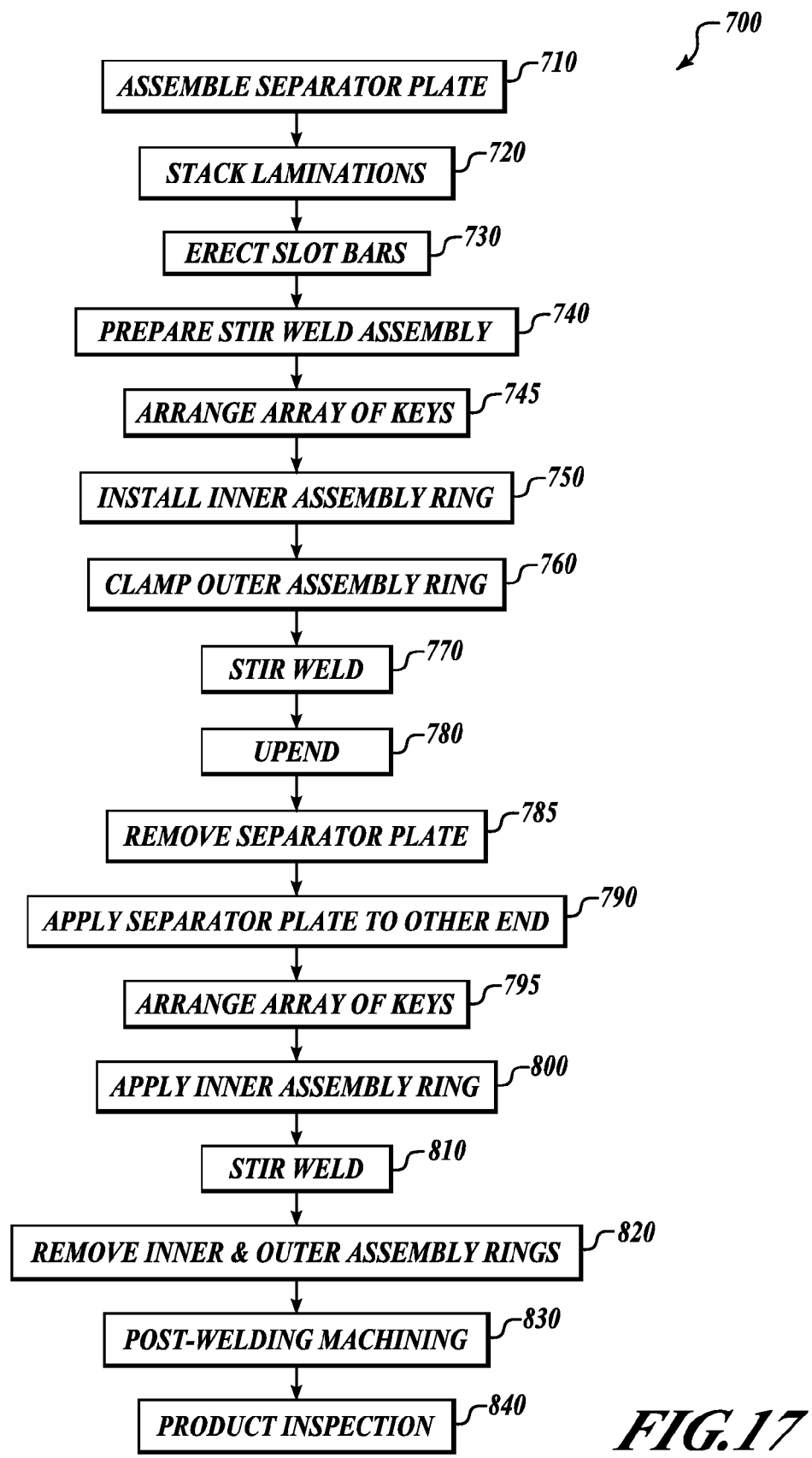
FIG. 17 is another example of an embodiment of a method of making stir-welded rotors.

In another example of an embodiment of a method 700, FIG. 17 illustrates a series of processes relating to a rotor that has stir-welded keys. In process 710, a flat, circular, lower separator plate is laid on a work surface and supports a toothed separator plate with teeth around its perimeter that are sized to register with slots in laminations and the slot bars. In process 720 laminations are stacked on the separator plate. In process 730, slot bars are erected 130. In process 740, the stir weld assembly is prepared. This may include several processes, such as arranging the keys to be welded around the upper ends of the slot bars, in process 745. An inner assembly ring may be installed in process 750 and an outer assembly ring clamped around the assembly in process 760. The clamped assembly is now in condition for stir welding the keys to ends of the slot bars to form a substantially continuous, circular, stir weld, in process 770. Once welded, the assembly is upended, in process 780. The separator plate is removed in process 785 and applied to the underside of the assembly, adjacent the stir-welded keys, as a support, in process 790. Keys are arranged on top of the assembly around the exposed upper ends of the slot bars, in process 795. The outer assembly ring may have to be unclamped in order to do this. After the keys are in place, and the outer assembly ring is clamped on if it was removed, an inner assembly ring is applied in process 800. The keys are stir welded to the slot bars in process 810 to form a substantially continuous, circular, stir weld. The inner and outer assembly rings are removed in process 820. Post-stir welding machining of the stir-welded rotor may then be carried out in process 830. Process 830 may include for example, axial machining, radial machining and stamping to remove any extraneous material to produce a finished stir-welded rotor. Finally, the machined and stir-welded rotor product may be subjected to inspection for quality and performance criteria, in process 840.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A stir-welded rotor comprising:
  a stack of laminations, each of the laminations comprising spaced-apart slots arrayed on an outer circumference;
  a first end ring comprising a first inner slotted ring and a first outer slotted ring;
  a second end ring comprising a second inner slotted ring and a second outer slotted ring;
  slot bars registering with the spaced-apart slots of each of the laminations, the slot bars each having a first extremity engaging the first end ring between the first inner slotted ring and the first outer slotted ring and extending above the stack of laminations, and a second extremity engaging the second end ring between the second inner slotted ring and the second outer slotted ring and extending below the stack of laminations; and a first stir weld securing the first extremities of adjacent slot bars to the first inner slotted ring and the second outer slotted ring, and a second stir weld securing the second extremities of adjacent slot bars to the second inner slotted ring and the second outer slotted ring.

2. The rotor of claim 1, wherein the first stir weld comprises a first series of stir-weld consolidated keys, the first series of stir-weld consolidated keys welded to at least first extremities of the slot bars.

3. The rotor of claim 2, wherein the second stir weld comprises a second series of stir-weld consolidated keys, the second series of stir-weld consolidated keys welded to at least second extremities of the slot bars.

4. The rotor of claim 1, wherein the first stir weld is substantially continuous and substantially circular.

5. The rotor of claim 1, wherein the laminations comprise round flat plates with circular central bores and spaced apart circumferential slots, and wherein the first stir weld extends around the rotor proximate a circular perimeter thereof.

6. The rotor of claim 1, further comprising a thin electrically insulating material covering at least a portion of the slot bars to form a barrier between the slot bars and the laminations.

7. A stir-welded rotor comprising:

a first end ring comprising a first inner slotted ring and a first outer slotted ring;

a second end ring comprising a second inner slotted ring and a second outer slotted ring;

a stack of laminations, each of the laminations comprising spaced-apart slots arrayed on an outer circumference thereof, the stack of laminations interposed between the first end ring and the second end ring; and slot bars having first extremities and second extremities, the first extremities engaging the first end ring and the second extremities engaging the second end ring, the slot bars registering with the spaced-apart slots of each of the laminations;

a first stir weld securing the first extremities of the slot bars to the first inner slotted ring and the first outer slotted ring; and a second stir weld securing the second extremities of the slot bars to the second inner slotted ring and the second outer slotted ring.

8. The rotor of claim 7, further comprising a thin electrically insulating material covering at least a portion of the slot bars to form a barrier between the slot bars and the laminations.

* * * * *